US006965588B2

(12) United States Patent
Schmidt et al.

(10) Patent No.: US 6,965,588 B2
(45) Date of Patent: Nov. 15, 2005

(54) METHOD FOR EXPEDITING TRANSITIONS BETWEEN STATES OF OPERATION IN COMMUNICATIONS EQUIPMENT

(75) Inventors: Christopher R. Schmidt, Pinole, CA (US); John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 535 days.

(21) Appl. No.: 10/303,255

(22) Filed: Nov. 25, 2002

(65) Prior Publication Data

US 2003/0099214 A1 May 29, 2003

Related U.S. Application Data

(60) Provisional application No. 60/334,307, filed on Nov. 29, 2001.

(51) Int. Cl.$^7$ .............................................. H04Q 7/24
(52) U.S. Cl. ..................................... 370/338; 455/455
(58) Field of Search .............................. 370/310, 310.2, 370/328, 331, 338, 332; 455/450, 455, 439, 455/436, 442, 9, 13.4, 522, 515, 516, 456.5, 455/463, 561; 375/130, 138, 148

(56) References Cited

U.S. PATENT DOCUMENTS

| 6,167,270 | A | 12/2000 | Rezaiifar et al. | |
|---|---|---|---|---|
| 6,463,044 | B1 * | 10/2002 | Seo | 370/329 |
| 6,519,235 | B1 * | 2/2003 | Kim et al. | 370/331 |
| 6,725,053 | B2 * | 4/2004 | Rosen et al. | 455/518 |
| 6,738,617 | B2 * | 5/2004 | Rosen et al. | 455/418 |
| 2002/0055364 | A1 * | 5/2002 | Wang et al. | 455/466 |
| 2002/0075823 | A1 * | 6/2002 | Lee et al. | 370/328 |
| 2002/0141361 | A1 * | 10/2002 | Madour et al. | 370/331 |

FOREIGN PATENT DOCUMENTS

WO    WO 99/38178 A1    7/1999

OTHER PUBLICATIONS

3GPP2: "Data Service Options for Spread Spectrum Systems: cdma2000 High Speed Packet Data Service Option 33" 3$^{rd}$ Generation Partnership Project 2; 3GPP2, Aug. 2000, PP1-62.

* cited by examiner

*Primary Examiner*—Wellington Chin
*Assistant Examiner*—Brenda Pham
(74) *Attorney, Agent, or Firm*—Lalita W. Pace

(57) ABSTRACT

An apparatus and method for optimizing the transition of a Mobile Station (MS) between states of operation for packet data service. An RF connection is established between the MS and Base Site Equipment (BS) for the transmission of data packets. After a period of inactivity of transmission, the RF connection is released and the BS provides the MS with the equipment identifier of the network element that will maintain the connection with a PDSN. The MS retains the identifier while in the Dormant state and a new Semi-Dormant state and sends the identifier to the BS when requesting reactivation. In the Dormant state, the network element maintaining the connection to the PDSN is the PCF. In the Semi-Dormant state, the network element maintains the connection between to the PDSN is the SDU. When the BS has data to transmit to a MS in the Semi-Dormant state, it channel assigns the MS into the Active state according to pilots reported in RF Measurement Report Messages previously received from the MS.

19 Claims, 4 Drawing Sheets

METHOD FOR EXPEDITING TRANSITIONS BETWEEN STATES OF OPERATION IN COMMUNICATIONS EQUIPMENT

REFERENCE(S) TO RELATED APPLICATION(S)

The present application claims priority from provisional application, Ser. No. 60/334,307, entitled "A METHOD FOR EXPEDITING TRANSITIONS BETWEEN STATES OF OPERATION IN COMMUNICATIONS EQUIPMENT," filed Nov. 29, 2001, which is commonly owned and incorporated herein by reference in its entirety.

FIELD OF THE INVENTION

The present invention relates generally to the field of communication systems, and more particularly, to call setup in communications equipment.

BACKGROUND OF THE INVENTION

3GPP2 packet data standard TIA/EIA/707-A-1.12 (Data Service Options for Spread Spectrum Systems: cdma2000 High Speed Packet Data Service Option 33), and subsequent versions (hereinafter referred to as IS-707), specifies an Active state and a Dormant state for a wireless communication device, such as a mobile station (MS), during a packet data session. In the Active state, the MS is connected to infrastructure equipment via a dedicated RF connection. The infrastructure provides a dedicated connection between a Base Transceiver Station (BTS) and a Packet Control Function (PCF). The PCF is connected to a Packet Data Service Node, which is connected to a packet network. A packet call is moved into the Active state when there is a burst of packet data to transmit.

In the Dormant state, the dedicated Radio Frequency (RF) connection, and the dedicated connection between the BTS and the PCF, are released. The packet call transitions from the Active state to the Dormant state when there has been no data transmission for a predetermined time period. The packet call may transition between the Active state and the Dormant state many times, depending on the bursty nature of the data and on the duration of the time period. While the packet session is in the Dormant state, bearer data cannot be transmitted, and must be buffered. In order transmit the buffered data, the call must be assigned a dedicated RF connection and a dedicated connection between the BTS and the PCF must be established. The delay incurred in order to reestablish a dedicated connection between the MS and the PCF has a negative impact on the quality of the data service.

Current standards impose a high transaction cost on centralized processing elements for the time needed for Dormant to Active transitions. The time needed has a potentially negative impact on a subscriber's perception of data service. These problems encourage configurations where the RF connection is maintained for a long period of time after transmission of a data burst, so that a subsequent data burst can immediately be transmitted. Maintaining a connection for an unnecessarily long period of time inefficiently uses RF resources. For example, if a channel is maintained for 60 seconds for transmission of a series of bursts of packet data, one channel can offer 60 Busy Hour Call Attempts (1 channel*3600/60). If, however, the channel is maintained for only 5 seconds for transmission of a burst, one channel can offer 720 BHCA (1 channel*3600/5). In the latter case, Dormant to Active transitions (i.e. call attempts) will increase because the channel is maintained for a shorter period of time. In the former case, the long timeout period decreases the effective utilization of the dedicated channel, and increases the number of dedicated channels required to support the packet data service.

Thus, there is a need for a method of transitioning a wireless communication device between the Dormant state and Active state by timely releasing RF resources when there is no bearer data to transmit and timely reestablishing RF resources when there is bearer data to transmit.

SUMMARY OF THE INVENTION

The present invention provides a method for optimizing the transition of a wireless communication device from the Dormant state and a newly introduced Semi-Dormant state to the Active state. In the preferred embodiment, the wireless communication device is a MS. When a call (connection) is released between the MS and Base Site (BS) equipment, the BS provides the MS with the equipment identifiers of the network elements that maintain the connection with a Packet Data Service Node (PDSN). The MS retains the identifiers and sends the appropriate identifier to the BS when requesting reactivation (transition to Active state). In the Dormant state, the network element maintaining the connection to the PDSN is the PCF because the SDU has been released and disconnected. When the BS receives the reactivation request from the MS, it connects the PCF to the RF bearer path that is established to the MS. When the MS is in the Semi-Dormant state, the network element maintaining the connection between the BS and PDSN for the call is the SDU. The MS retains the identifier of the SDU while in the Semi-Dormant state and sends the identifier to the BS when requesting reactivation. When the BS receives the reactivation request from the MS, it connects the SDU to the RF bearer path that is established to the MS. Details of the invention will now be described with reference to the figures.

DETAILED DESCRIPTION OF THE INVENTION

Figure 1:
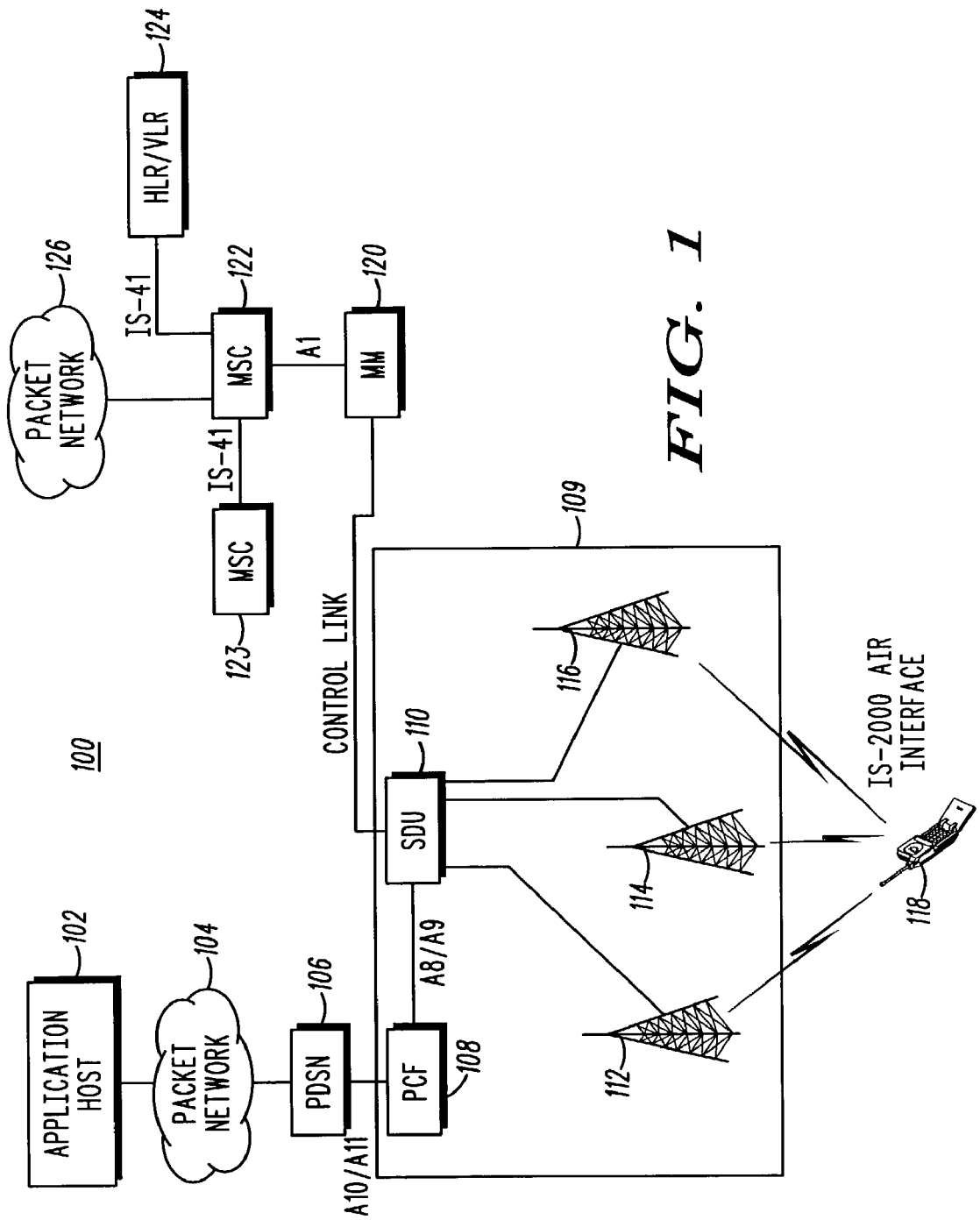
FIG. 1 is a functional block diagram of a system that can be used to implement the apparatus and method of the present invention.

Referring to FIG. 1, a functional block diagram of a system that can be used with the present invention is shown. FIG. 1 shows a MS 118 in soft handoff with three BTSs 112, 114, 116 for communicating with an Application Host 102. The Application Host 102 is connected to a Packet Network 104 for uploading and downloading information. The Packet Network 104 is connected to a PDSN 106. The PDSN 106 provides the interface between the Packet Network 104 and the BS equipment 109 for packet data services. The PDSN 106 is connected to a PCF 108 over an A10/A11 interface (as specified in 3GPP2 A.S0001-A, "3GPP2 Access Network Interfaces Interoperability Specification", and subsequent versions). The PCF 108 provides buffering for data received from the PDSN 106. The PCF 108 is connected to a Selection and Distribution Unit (SDU) 110 over an A8/A9 interface (as specified in 3GPP2 A.S0001-A and subsequent versions). The SDU 110 maintains soft handoffs between the MS 118 and the BTSs 112, 114, 116. The SDU 110 also selects the best data transmission received from the MS 118 via the BTS 112, 114, 116 for transmission to the PCF 108 and distributes copies of data destined for the MS 118 to all BTSs 112, 114, 116 that the MS 118 is in soft handoff with. Control messages to/from the MS 118 originate/terminate at the SDU 110. The BTSs 112, 114, 116 transmit and receive bearer data and control information over a dedicated RF traffic channel to the MS 118.

The SDU is also connected to a Mobility Manager (MM) 120 via a control link. The MM 120 provides control functions for calls connected on the BS equipment 109. For example, the MM 120 monitors the state of a call and determines when the call should be released, decides when soft handoff should occur, and decides which BTSs should be added or dropped in soft handoff, etc. The MM 120 is connected to a Mobile Switching Center (MSC) 122 over an A1 interface (as specified in 3GPP2 A.S0001-A and subsequent versions). The MSC 122 interfaces the MM 120 to the Public Switch Telephone Network (PSTN) 126. The MSC 122 is also connected to a Home Location Register/Visitor Location Register (HLR/VLR) 124 over an IS-41 interface. The HLR/VLR 124 maintains subscriber information such as name, telephone number and credit card information. When the MS 118 is in its home network, the HLR 124 determines the location of the MS 118 and provides information to the MSC 122. When the MS 118 is in a visitor network, the VLR 124 obtains a copy of the HLR information and provides it to a MSC, such as MSC 123, in the visitor network. MSC 122 and MSC 123 are connected via an IS-41 interface. The elements and interfaces shown in FIG. 1 are commonly known in the art, and thus are not described further herein.

Figure 2:
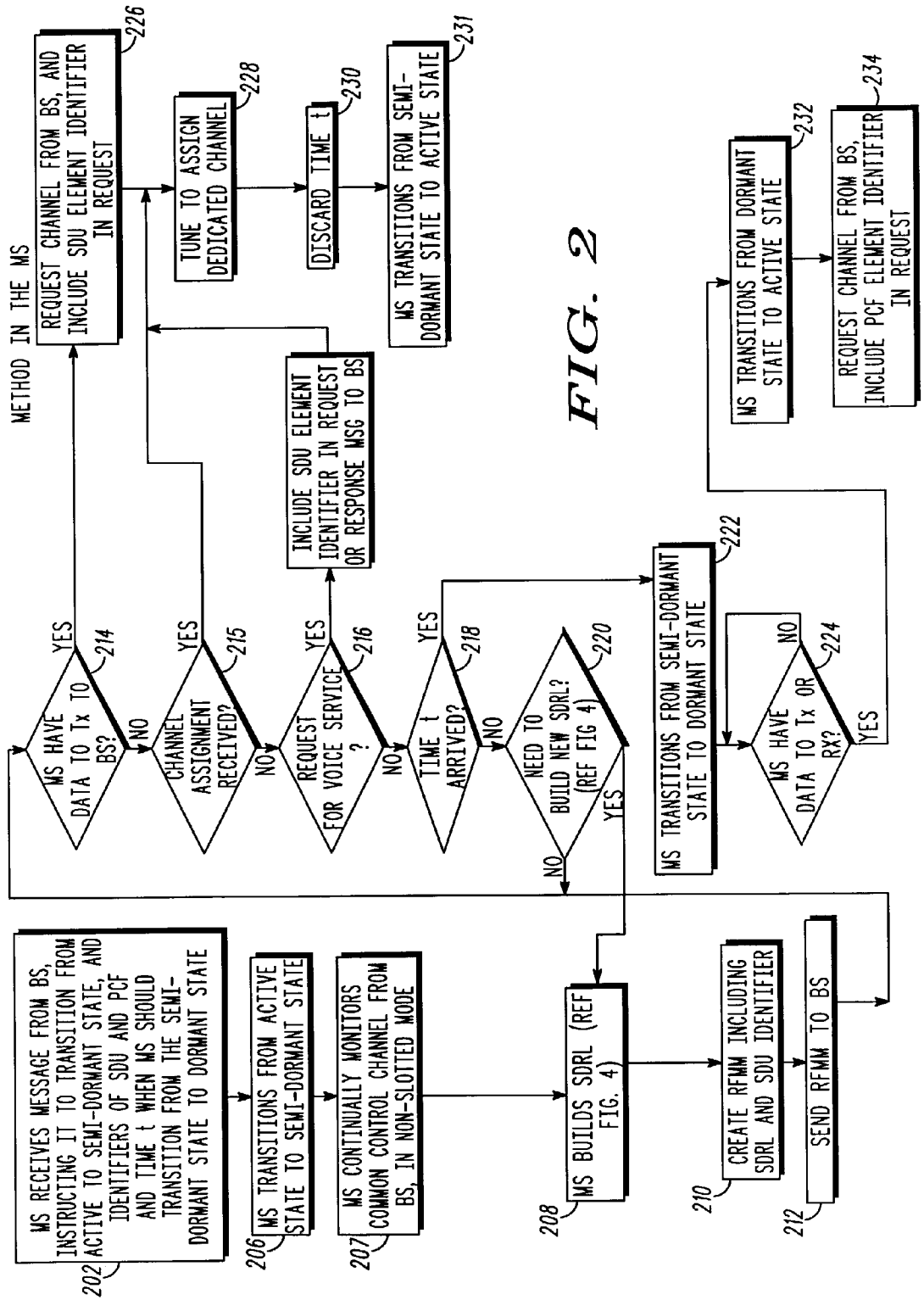
FIG. 2 is a flow chart of the preferred embodiment of the method of the present invention in the wireless communication device.

Referring to FIG. 2, a flowchart of the preferred embodiment of the method of expediting transitions between states of operation in a MS 118 is shown. The method runs on any microprocessor or computer commonly known in the art. When the MS 118 transitions from the Dormant or Semi-Dormant state to the Active state, the BS 109 must locate the network element maintaining the connection between the BS 109 and PDSN 106 for the call. The BS 109 then connects the network element to the RF bearer path that is established to the MS 118. Locating the network element delays the transmission of bearer frames. However, in accordance with the present invention, the delay can be avoided if the BS 109 provides the MS 118 with the equipment identifier of the network element when the session is first established. At step 202, when no data has been transmitted between the MS 118 and the SDU 110 for a predetermined period of time, the BS 109 instructs the MS 118 to release the dedicated RF connection, and the BS 109 and MS 118 transition to the Semi-Dormant state. The BS 109 also sends the MS identifiers for the SDU 110 and PCF 108 and a time "t" when the MS 118 will transition from the Semi-dormant state to the Dormant state. In the preferred embodiment, the equipment identifiers are the IP addresses and Port addresses of the SDU 110 and PCF 108. At step 206, the MS 118 transitions from the Active state to the Semi-dormant state. In an alternate embodiment, the BTS 112, 114, 116 caches the equipment identifiers. When the MS 118 reconnects, the BTS 112, 114, 116 can quickly retrieve the equipment identifier and use it to setup the connection for the call.

At step 208, the MS 118 builds a Semi-Dormant Report list (SDRL). When the BS 109 initiates the MS's transition from the Dormant or Semi-Dormant state to the Active state, it must locate the MS 118 in order to set up an RF connection between the BTS 112, 114, 116 and the MS 118. This is currently done by paging the MS 118 and waiting for a page response. The paging/paging response procedure delays the start of transmission of bearer frames. If the BS 109 knows which sectors can maintain a connection to the MS 118, a channel assignment can immediately be sent to the MS 118, bypassing the page and page response procedure, and starting the transmission of bearer frames sooner. To support this, the MS 118 sends the BS 109 signal strength information via the common control channel while in the Semi-Dormant state. Preferably, the signal strength information is conveyed in a RF Measurement Report Message (RFMM). The pilots reported in the RFMM are those pilots in the Semi-Dormant Report List. When the BS 109 initiates re-activation, in step 215, it will have enough information to immediately channel assign the MS 118 into the Active state. To minimize the delay to transmit a channel assignment message from the BS 109 to the MS 118 when the BS 109 initiates re-activation, the MS 118 will continuously monitor the common control channel while in the Semi-Dormant state (step 207 in FIG. 2).

Parameters for the Semi-Dormant Report List are provided to the MS 118 via overhead channels and the traffic channel. The parameters include:
1. Max-Pilot-Num—Maximum number of pilots to report in the RFMM;
2. Min-Pilot-Num—Minimum number of pilots to report in the RFMM;
3. Signal-Strength-High-Threshold (SSHT); and
4. Signal-Strength-Low-Threshold (SSLT).

The method of the present invention uses these parameters to determine when the MS 118 should send an RFMM to the BS 109. The method is biased towards minimizing the number of times an RFMM is transmitted, at the expense of including more pilots than necessary in the SDRL. As currently standardized, when no radio channels are assigned, the MS 118 is typically in the IS-2000 Mobile Station Idle state. In this state, it maintains and continually updates an Active Set, consisting of the BS whose Pilot Channel (hereafter also referred to as a pilot) is received with the highest signal strength, and thus whose Paging Channel (PCH) or Forward Common Control Channel (F-CCCH) is being monitored. The MS 118 also maintains and updates a Neighbor Set consisting of other BSs 109 whose Pilot Channels (hereafter also referred to as a pilots) are detectable, but are not the strongest. The process of maintaining and updating is specified in Section 2.6.2.1.4 of 3GPP2 C.S0005-0, and subsequent versions (hereinafter referred to as IS-2000), as commonly known in the art. When the MS 118 is in the IS-2000 Mobile Station Idle state, as specified in Section 2.6.2 of IS-2000, and the MS 118 is also in the new IS-707 Semi-Dormant state, it builds the SDRL to send to the BS 109. The SDRL contains the Active Set pilot and pilots from the Neighbor Set with the highest signal strength as monitored by the MS 118.

In constructing the SDRL, the MS 118 attempts to include at least Min-Pilot-Num pilots, and not more than Max-Pilot-Num pilots. The list consists of the Active Set pilot and the strongest Neighbor Set pilots, wherein the aggregate signal strength of these pilots exceeds or equals Signal-Strength-High-Threshold. When the aggregate signal strength does not exceed or equal Signal-Strength-High-Threshold, the list consists of Max-Pilot-Num pilots including the Active Set pilot and the strongest Neighbor Set pilots. The MS continually calculates the aggregate signal strength of the SDRL and updates the list accordingly.

In addition to the SDRL, the RFMM also includes the IP/Port address of the network entity that processes the SDRL (i.e. the SDU). The BS 109 conveys the SDRL to this address. When the BS 109 needs to transmit a burst of data to the MS 118, it uses the SDRL to determine an Active Set, allocate radio channels, and send a channel assignment message to the MS 118, via the control channels of the pilots in the SDRL. The channel assignment message is transmitted over the PCH or F-CCCH in non-slotted mode, using the Quick Paging Channel (QPCH) supported indication provided by the MS 118 in its most recent Origination or Page Response message to determine whether QPCH paging procedures are to be used. This results in immediate channel assignment of the MS 118. The MS 118 monitors the paging channel or QPCH in non-slotted mode when in the Semi-Dormant state, and is capable of receiving and processing a channel assignment message in this state. The MS 118 monitors control channels of only those pilots that it has reported to the BS 109 in the SDRL included in the RFMM.

Given the explanation of the SDRL and RFMM and how these entities are created and processed, we now turn our attention back to the flowchart of FIG. 2. After the SDRL is built at step 208, the method creates the RFMM, which includes the SDRL and the SDU identifier (step 210). At step 212, the RFMM is sent to the BS 109. At step 214, the MS 118 determines whether it has data to transmit to the BS 109. If the MS 118 has data to transmit, at step 226, the MS 118 requests a channel from the BS 109 and includes the SDU element identifier in the request. The BS 109 uses pilot strength information in the request, as specified in Section 2.1.1.4.1.2 of 3GPP2 C.S0004-0 and subsequent versions, and which is well known in the art, to determine from which sectors to assign RF channels. At step 228, the MS 118 tunes to the assigned dedicated RF channel. At step 230, the MS 118 discards time t. At step 231 the MS 118 transitions from the Semi-Dormant state to the Active state. Referring back to step 214, if the MS 118 has data to receive from the BS 109, at step 215, the MS 118 receives a channel assignment from the BS 109. At step 228, the MS 118 tunes to the assigned channels and proceeds to step 230 and 231 as previously described.

Referring back to step 215, if the MS 118 has not received a channel assignment, it determines whether a request for voice service has been received (step 216). This step may occur if the MS 118 is Simultaneous Voice Data (SVD) capable. If the MS 118 is SVD capable, it can receive a request for voice service while a data call is in session. In such a case, the MS 118 sends the SDU element identifier to the BS 109 in its initial access (step 217), and the method continues processing at step 228. At steps 230 and 231, the MS 118 discards timer t, and transitions from the Semi-Dormant state to the Active state, respectively. This enables the BS 109 to connect the voice call to the SDU 110 maintaining the data call. When the data call transitions into the Active state, the same SDU can more efficiently handle concurrent bearer channels.

Referring back to step 216, if the MS 118 is not SVD capable, the method determines whether time t has arrived (step 218). If time t has not arrived, the method determines whether there is a need to build a new SDRL (step 220). A description of how this determination is made is provided with reference to FIG. 4 in a subsequent paragraph. If there is a need to build a new SDRL, the method proceeds to step 208 and continues processing as described above. If there is no need to build a new SDRL, the method proceeds to step 214 and continues processing as previously described.

Referring back to step 218, if time t has arrived, the MS 118 transitions from the Semi-Dormant state to the Dormant state (step 222). In the Dormant state, the MS 118 stops sending RFMMs, starts monitoring the PCH or F-CCCH of the Active set BS in slotted mode (if it is a slotted mode capable MS), and the BS 109 releases the SDU resource 110. While in the Dormant state, the MS 118 monitors whether it has data to transmit or receive (step 224). When the MS 118 has data to transmit or receive, it transitions to the Active state (step 232) and requests a channel assignment from the BS 109 (step 234). This time, the request includes the PCF element identifier because the MS 118 was previously in the Dormant state.

Figure 3:
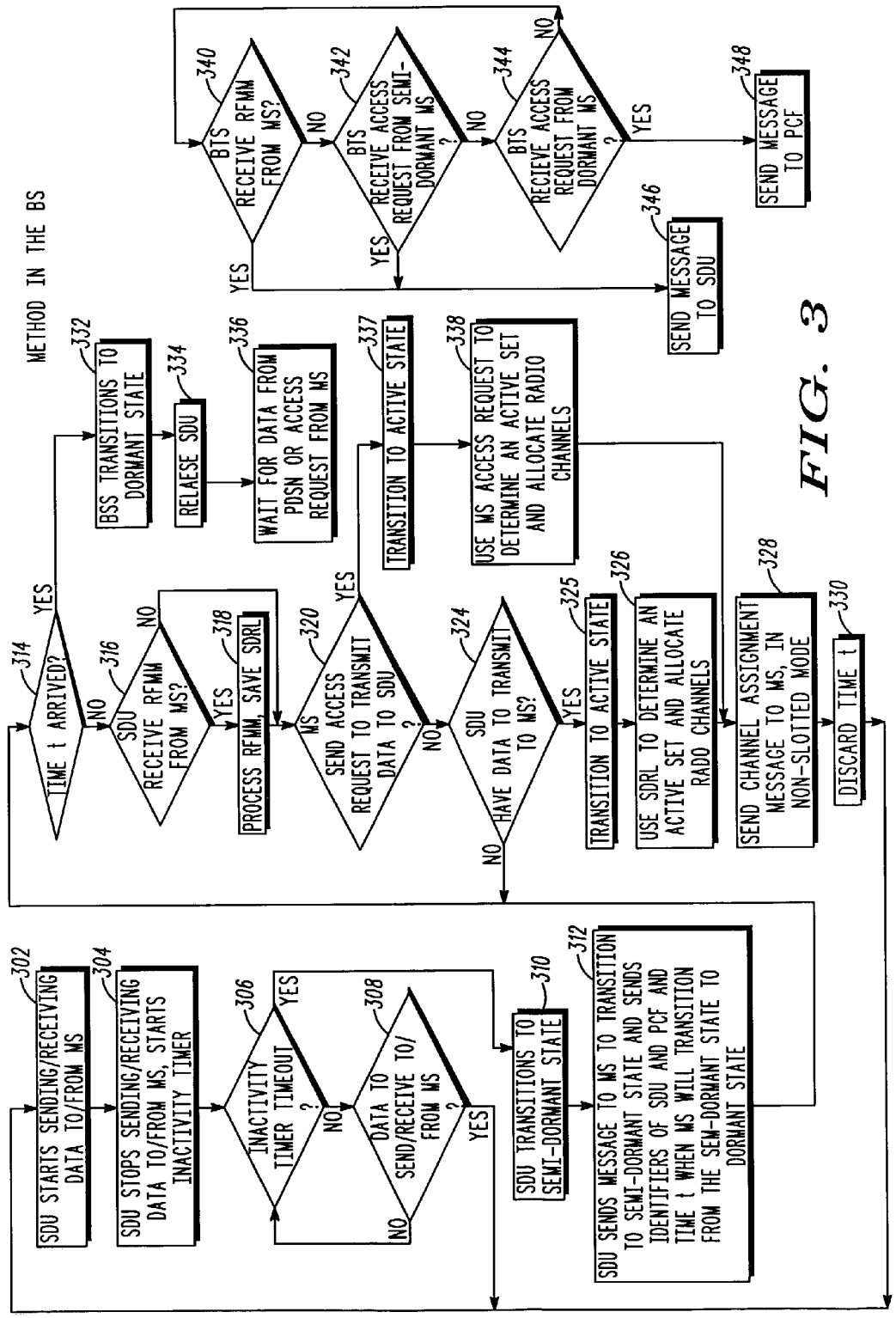
FIG. 3 is a flow chart of the preferred embodiment of the method of the present invention in the base site equipment.

Turning now to FIG. 3, a flowchart of the preferred embodiment of the method in the BS 109 is shown. The method in the BS 109 runs in both the SDU 110 and the BTS 112, 114, 116 on any microprocessor or computer commonly known in the art. The method is first described with reference to the SDU 110. At step 302, the SDU 110 begins sending/receiving data to/from the MS 118. At step 304, the SDU stops sending/receiving data to/from the MS 118 and starts an inactivity timer. The inactivity timer sets a limit on the amount of time that can pass without the SDU sending or receiving data. At step 306, the SDU determines whether the inactivity timer has expired. If the timer has not expired, the SDU again determines whether there is data to send or receive (step 308). If there is no data to send or receive, the method remains in a loop consisting of steps 306 and 308 until the inactivity timer expires or until there is data to send or receive. When there is data to send or receive, the method proceeds to step 302 and continues processing as previously described. When the timer expires, the SDU 110 transitions from the Active state to the Semi-Dormant state (step 310). At step 312, the SDU 110 sends a message instructing the MS 118 to transition to the Semi-Dormant state. The message includes the identifiers of the SDU 110 and PCF 108 and time t when the MS 118 should transition from the Semi-Dormant state to the Dormant state. At step 314, the method determines whether time t has arrived. If time t has arrived, the BS 109 transitions to the Dormant state (step 332) and releases the SDU 110 (step 334). At step 336, the BS 109 waits for data from the PDSN 106 or an access request (Origination message) from the MS 118.

Referring back to step 314, if time t has not arrived, the method determines whether the SDU 110 has received a RFMM from the MS 118. If the SDU 110 has received a RFMM, the RFMM is processed, the SDRL is saved (step 318) and the method proceeds to step 320. If the SDU has not received a RFMM, the method proceeds to step 320. At step 320, the method determines whether the MS 118 has requested access to transmit data to the SDU 110. If the MS 118 has requested access, the SDU transitions to the Active state (step 337), uses the access request (Origination Message) to determine an Active set (which sectors the MS 118 is in) and to allocate radio channels to the MS 118 (step 338), and proceeds to step 328. If the MS 118 has not requested access, the method determines whether the SDU 110 has data to transmit to the MS 118 (step 324). If the SDU has no data to transmit, the method proceeds to step 314 and continues processing as previously described. If the SDU has data to transmit, the SDU transitions to the Active state (step 325) and uses the SDRL saved at step 318 to determine an Active set and to allocate radio channels to the MS 118 (step 326). At step 328, the method sends a channel assignment message to the MS 118. At step 330, the SDU discards time t. The method proceeds to step 302 to continue processing as previously described.

The method in the BTS 112, 114, 116 will now be described. At step 340, the method determines whether the BTS 112, 114, 116 has received a RFMM from the MS 118. If the answer is yes, the method sends the RFMM to the SDU 110 (step 346). If the answer is no, the method determines whether the BTS 112, 114, 116 has received an Access request from a Semi-Dormant MS 118. If the answer is yes, the method sends the request to the SDU 110 (step 346). If the answer is no, the method determines whether the BTS 112, 114, 116 has received an Access request from a Dormant MS 118. If the answer is yes, the method sends the request to the PCF 108 (step 348). If the answer is no, the method proceeds to step 340 and continues processing.

Figure 4:
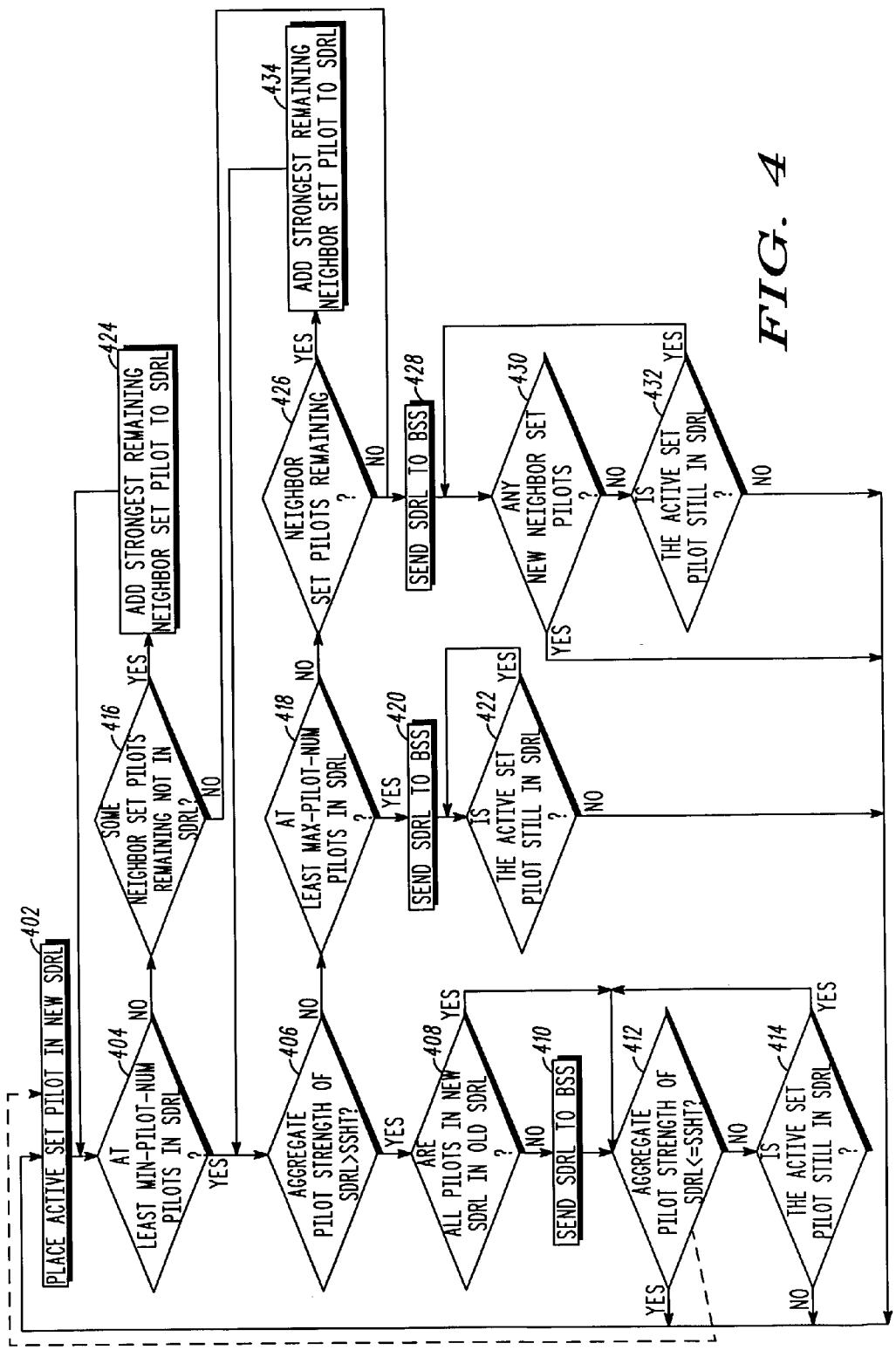
FIG. 4 is a flow chart of the preferred embodiment of the step of building an SDRL shown in the flow chart of FIG. 2.

The process of constructing the SDRL is shown in the flowchart of FIG. 4. Note that the process of determining the Active set pilot and the Neighbor set pilots operates as specified in Section 2.6.2.1.4 of IS-2000. However, the members of the Active set and Neighbor set are compared to the members of the SDRL at various points, as described in the invention, and the results of these comparisons determine actions with respect to the SDRL. At step 402, the method places the Active set pilot in the SDRL. At step 404, the method determines whether the minimum number of pilots to report in the RFMM are in the SDRL. If the minimum number has not been reached, the method determines whether there are any remaining neighbor set pilots (step 416). If there are neighbor set pilots remaining, the method adds the strongest of the remaining neighbor set pilots to the SDRL (step 424) and proceeds to step 404 to continue processing. If there are no remaining neighbor set pilots, the method sends the SDRL to the BS 109 (step 428). At step 430, the method determines whether there are any new neighbor set pilots. If there are, the method proceeds to step 402 and continues processing. If there are none, the method determines whether the Active set pilot is still in the SDRL (step 432). If the Active set pilot is no longer in the SDRL, the method proceeds to step 402 and continues processing. If the Active set pilot is still in the SDRL, the method proceeds to step 430 to continue processing.

Referring back to step 404, if the minimum number of pilots to report in the RFMM have been reached, the method determines whether the aggregate pilot strength of the SDRL is greater than the SSHT (step 406). If the answer is no, the method determines whether the maximum number of pilots to report in the RFMM are in the SDRL (step 418). If the answer is no, the method determines whether there are any neighbor set pilots remaining (step 426). If there are, the method adds the strongest of the remaining Neighbor set pilots to the SDRL (step 434) and proceeds to step 406 to continue processing. If there are no remaining Neighbor set pilots, the method sends the SDRL to the BS 109 (step 428) and continues processing at step 430 as previously described. Referring back to step 418, if the maximum number of pilots to report in the RFMM are in the SDRL, the method sends the SDRL to the BS 109 (step 420). At step 422, the method determines whether the Active set pilot is still in the SDRL. The method continues to probe whether the Active set pilot is still in the SDRL until the answer is no. The method then continues processing at step 402.

Referring back to step 406, if the aggregate pilot strength of the SDRL is greater than the SSHT, the method determines whether all the pilots in the new SDRL are the same as the pilots in the previous SDRL (step 408). If the answer is no, the method sends the new SDRL to the BS 109 (step 410) and determines whether the aggregate pilot strength of the SDRL has become less than the SSLT (step 412). As noted by the dotted line in FIG. 4, if this is the first time an SDRL has been constructed, the previous SDRL is considered a null set; thus the result is 'no' and the method proceeds to step 410. If the answer is yes, the method proceeds to step 402 to build a new SDRL. If this is not the first time an SDRL has been constructed and the answer is no, the method determines whether the Active set pilot is still in the current SDRL (step 414). If the answer is no, the method proceeds to step 402 to build a new SDRL. If the answer is yes, the method proceeds to step 412 to continue processing. Referring back to step 408, if all pilots in the new SDRL are in the previous SDRL, the method does not send the new SDRL to the BS 109 and continues at step 412 to check the aggregate strength of the new SDRL (step 412).

As described in the previous paragraphs, the creation of the SDRL is an iterative process. The MS 118 attempts to construct an SDRL consisting of at least Min-Pilot-Num pilots, and not more than Max-Pilot-Num pilots. When possible, the list consists of the Active Set pilot and the strongest Neighbor Set pilots whose aggregate signal strength exceeds or equals Signal-Strength-High-Threshold. Otherwise, if the aggregate signal strength of the strongest Max-Pilot-Num pilots does not exceed Signal-Strength-High-Threshold, the MS 118 constructs an SDRL of Max-Pilot-Num pilots consisting of the Active Set pilot and the strongest Neighbor Set pilots. The MS 118 continually calculates the aggregate signal strength of the SDRL. If the aggregate signal strength of the SDRL is above or equals Signal-Strength-High-Threshold when it is created, then falls below Signal-Strength-Low-Threshold, the MS 118 constructs a new SDRL. If the aggregate signal strength of the SDRL is above or equals Signal-Strength-High-Threshold when it is created, then the Active Set pilot changes and the new Active Set pilot is not in the SDRL, the MS 118 constructs a new SDRL and sends it to the BS 109 in an RFMM. If the aggregate signal strength of the SDRL is below Signal-Strength-High-Threshold when it is created and the Active Set pilot changes to an Active Set pilot that is not in the current SDRL, the MS 118 constructs a new SDRL and sends the SDRL to the BS 109 in an RFMM. If the aggregate strength of the SDRL was originally below Signal-Strength-High-Threshold, and the aggregate strength then rises above or equals Signal-Strength-High-Threshold, the MS 118 does not create a new SDRL.

Transmission of the RFMM in the Semi-Dormant state likely consumes additional MS 118 battery power and impacts access channel capacity. The system operator can tune the operation of Semi-Dormant state procedures in order to strike an optimal balance between quality of the data service from a subscriber perspective, RF channel utilization, battery power, and access channel capacity. This tuning can be achieved by modifying the time that the MS 118 is in the Semi-Dormant state (time t), by modifying the maximum size of the SDRL, and by modifying the Signal-Strength-High/Low-Threshold parameters.

If the ACH (Access Channel or EACH Enhanced Access Channel) begins to become loaded, it may be necessary to reduce ACH loading by selectively turning the method of the present invention off. ACH loading is detected at the BTS 112, 114, 116. As an alternative to turning the method off, when ACH loading exceeds a threshold, the BS 109 may attempt to reduce ACH loading through use of a shorter Semi-dormant to dormant inactivity timer. In addition, the SDU may track the rate at which each MS is sending SDRLs. If this rate exceeds a threshold for a particular user, that user may be given a shorter Semi-dormant to dormant inactivity timer value. This will allow the network to reduce the ACH load by reducing the number of higher velocity/higher SDRL rate users that are in the Semi-dormant state. There may also be a provision for messaging a shorter Semi-dormant to dormant inactivity timer to a MS that is in the Semi-dormant mode, thereby enabling the user's timer to be changed, while the user is semi dormant. This message can be unacknowledged, as the network can resend the message if the MS continues to send SDRLs in a way that indicates the message was lost.

While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. In a wireless communication device, a method of expediting transitions between states of operation comprising the steps of:
   receiving, from base site equipment, a first equipment identifier of a first network element that will maintain a plurality of connections that remain after the device transitions from an Active state to a Semi-Dormant state;
   receiving, from base site equipment, a second equipment identifier of a second network element that will maintain a plurality of connections that remain after the device transitions from an Active to a Dormant state;
   transitioning from the Active state to the Semi-Dormant state;
   transitioning from the Semi-Dormant state to the Active state when the wireless communication device has data to transmit or receive; and
   when the device has data to transmit, sending a message over a common control channel to the base site equipment, wherein the message requests a dedicated channel and wherein the message comprises the first equipment identifier of the first network element that is maintaining the plurality of connections that remain after the device transitions from the Active state to the Semi-Dormant state.

2. The method of claim 1 wherein when the device is in the Semi-dormant state, the method continuously monitors a common control channel of an Active set pilot.

3. The method of claim 1 wherein the steps of receiving further comprise receiving a time t when the device should transition from the Semi-Dormant state to a Dormant state.

4. The method of claim 1 wherein while the device is in the Semi-Dormant state, the method comprises:
   building a Semi-Dormant Report List;
   creating an RF Measurement Report Message comprising the Semi-Dormant Report List and the first equipment identifier; and
   sending the RF Measurement Report Message to the base site equipment.

5. The method of claim 4 wherein the step of building a Semi-Dormant Report List comprises placing at least Min-Pilot-Num pilots comprising an Active Set pilot and a number of Neighbor Set pilots in the Semi-Dormant Report List such that an aggregate signal strength of the Active Set pilot and the number of Neighbor Set pilots in the Semi-Dormant Report List is greater than or equal to a Signal-Strength-High-Threshold.

6. The method of claim 5 wherein when the aggregate signal strength of the Semi-Dormant Report List is not greater than the Signal-Strength-High-Threshold, the method comprises adding a strongest remaining Neighbor Set pilot to the SDRL until the aggregate signal strength of the Semi-Dormant Report List is greater than or equal to the Signal-Strength-High-Threshold, until there are no remaining Neighbor Set pilots or until there are Max-Pilot-Num pilots in the Semi-Dormant Report List.

7. The method of claim 5 wherein when the aggregate signal strength of the Semi-Dormant Report List drops below a Signal-Strength-Low-Threshold, the method builds a new Semi-Dormant Report List.

8. The method of claim 5 wherein when the Active Set pilot changes, and a new Active Set pilot is not in the Semi-Dormant Report List, the method builds a new Semi-Dormant Report List comprising the new Active Set pilot.

9. The method of claim 2 wherein after the step of transitioning from the Semi-Dormant state to the Active state, the method further comprises discarding time t.

10. The method of claim 2 further comprising the step of transitioning from the Semi-Dormant state to the Dormant state when time t arrives.

11. The method of claim 10 further comprising:
    transitioning from the Dormant state to the Active state when the device has data to transmit or receive;
    sending a request for a communication channel to the base site equipment, wherein the request comprises the second equipment identifier of the second network element that is maintaining the plurality of remaining connections; and
    when the device has data to transmit or receive, sending a message over a common control channel to the base site equipment, wherein the message requests a dedicated channel and wherein the message comprises the second equipment identifier of the second network element that is maintaining the plurality of connections that remain after the device transitions from the Active state to the Dormant state.

12. In base site equipment, a method of expediting transitions between states of operation in a wireless communication device comprising sending a message to the wireless device instructing the device to transition from an Active state to a Semi-Dormant state, wherein the message comprises a first equipment identifier of a first network element that will maintain a plurality of connections in the Semi-Dormant state, and a second equipment identifier of a second network element that will maintain a plurality of connections in the Dormant state.

13. The method of claim 12 wherein the message further comprises a time t when the device should transition from the Semi-Dormant state to the Dormant state.

14. The method of claim 12 further comprising the step of transitioning from the Semi-Dormant state to the Dormant state when time t arrives.

15. The method of claim 12 further comprising the step of releasing the first network element and its plurality of connections and retaining the second network element and its plurality of connections when time t arrives.

16. The method of claim 12 wherein before sending a message to the wireless device, the method comprises transitioning the base site equipment from the Active state to the Semi-Dormant state when there has been no data transmission for a predetermined period of time.

17. The method of claim 16 wherein the base site equipment releases an RF connection and retains the first network element, the second network element, and their associated connections.

18. The method of claim 16 further comprising:

receiving an RF Measurement Report Message from the wireless device, wherein the RF Measurement Report Message comprises a Semi-Dormant Report List;

processing the RF Measurement Report Message; and saving the Semi-Dormant Report List.

19. The method of claim 16 further comprising the step of:

transitioning the base site equipment from the Semi-Dormant state to the Active state upon detecting that there is data to send to the wireless device, using the Semi Dormant Report List to allocate at least one communication channel to the wireless device;

sending a first channel assignment message to the wireless device; and sending a second channel assignment message immediately over the common control channel in non-slotted mode.

* * * * *